[11] 3,583,219

| | | |
|---|---|---|
| [72] | Inventor | Klaus Lunstroth<br>Houston, Tex. |
| [21] | Appl. No. | 854,023 |
| [22] | Filed | Aug. 22, 1969 |
| [45] | Patented | June 8, 1971 |
| [73] | Assignee | Adair Company<br>Houston, Tex.<br>Continuation of application Ser. No.<br>379,253, June 30, 1964, now abandoned. |

[54] BORE HOLE LOGGING
1 Claim, 2 Drawing Figs.

[52] U.S. Cl. .................................................. 73/151,
181/0.5 BE, 324/1
[51] Int. Cl. ................................................ E21b 49/00
[50] Field of Search .......................................... 73/151,
152, 155; 324/1, 2, 6—10; 340/18; 181/5 C1;
175/40, 48; 346/33

[56] References Cited
UNITED STATES PATENTS

| | | | |
|---|---|---|---|
| 2,650,067 | 8/1953 | Martin........................ | 73/152X |
| 3,291,219 | 12/1966 | Nutter......................... | 166/152X |

*Primary Examiner*—Jerry W. Myracle
*Attorneys*—Ned L. Conley, Murray Robinson, Carl B. Fox, Jr., James A. Borgfrede and Robert W. B. Kickerson ABSTRACT: A method of locating anomalies in a well bore containing a liquid by moving a drill string carrying a drill bit through the borehole. A sound detector and recorder are positioned within the drill string adjacent the bit. Movement of the drill bit through the liquid agitates the liquid to cause sound pressure variations which are picked up by the sound detector and recorded.

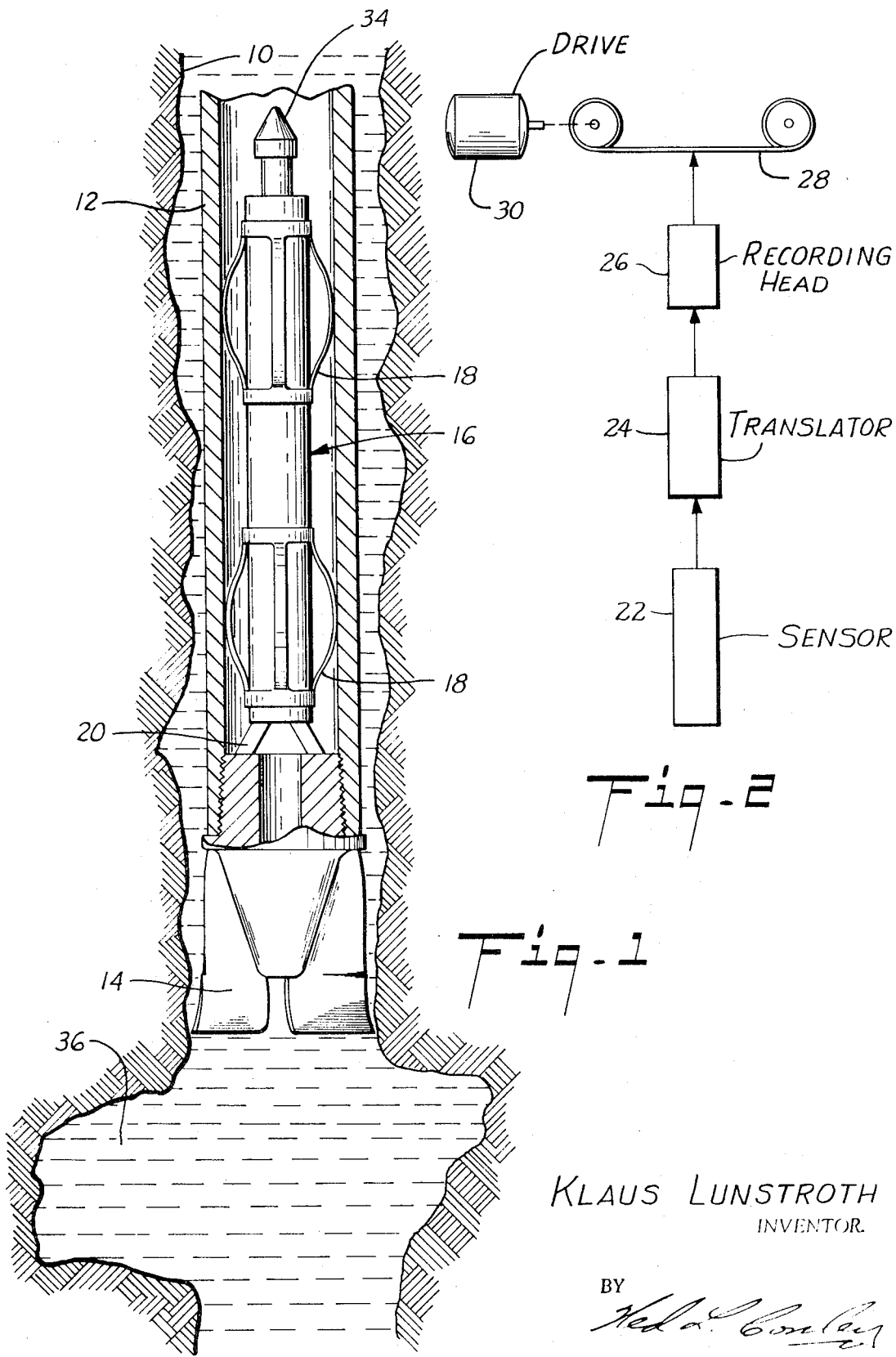

BORE HOLE LOGGING

This is a continuation of application Ser. No. 379,253 filed June 30, 1964.

BOREHOLE LOGGING

This invention relates in general to determination of anomalies in an earth borehole, and more particularly it relates to methods and apparatus for determining and recording transient effects caused by the movement of a well pipe in an earth borehole containing a liquid, for the purpose of obtaining an indication of physical characteristics of the borehole.

Methods for determining some of the characteristics of boreholes are well known, as for example by means of caliper logs, and devices for indicating zones of lost circulation. However these devices can only be employed while the drill pipe is removed from the borehole, thus their use necessitates a cessation of drilling.

It is an object of this invention to measure and record transient effects on the liquid in the hole while the drill bit is being moved up or down in the hole on the end of the drill string, such movement generally taking place on a round trip to change bits. Thus the measurements will not cause any undue delay in the drilling operation.

It is another object of this invention to provide a method which produces a record indicative of the physical dimensions of the borehole.

Another object of this invention is to provide means and a method for determining characteristics of the wall of a borehole while drilling operations are taking place.

Broadly this invention comprises a process for determining characteristics of a borehole by recording indications of transient effects on the drilling fluid in the well as the well pipe, as for example a drill string with drill bit attached, is moved vertically through the borehole. For a better understanding of the invention reference is now made to the accompanying drawings wherein:

FIG. 1 is a vertical sectional view of a borehole containing the lower end of a drill pipe including one embodiment of apparatus used to practice the present invention, and FIG. 2 is a somewhat diagrammatic view of one embodiment of apparatus for use in practicing this invention.

FIG. 1 shows a portion of an earth borehole 10 in which a drill string, the lower end 12 of which is shown, is suspended. A conventional drill bit 14 is shown attached to the lower end of the drill string. A sensing and recording instrument 16 is shown resting on the top of the drill bit, conventional centralizers 18 being used to position the instrument in the lower end of the drill pipe. Legs 20 on the lower end of the instrument may be used to rest the instrument on the top of the drill bit.

FIG. 2 shows diagrammatically one embodiment of the elements which may be comprised within the instrument 16. Thus these elements may comprise a pickup or sensor 22 which is adapted to sense variables and convert the variables to electrical, magnetic or mechanical signals. The variable may be any variable from which can be derived a systematic signal indication. In the present invention the variable may for example be the rate of flow of liquid through the drill pipe, the temperature of the liquid in the drill pipe, acoustical vibrations, pulsations of the liquid, the salinity of the liquid, and numerous other variables.

The signal produced by the sensor 22 is delivered to a translator 24 which is employed to amplify the signal, if necessary, and to convert the signal into a suitable form for delivery to a recording head 26. Recording head 26 and recording tape 28, upon which a record of variables is recorded, may be of any convenient type. A drive means 30 is provided to drive the tape 28.

The recording may be accomplished by the use of electrochemical sensitive elements, or by photographic means, or by magnetic means, all of which are well known in the prior art. For example recording may be accomplished in the manner disclosed in U.S. Pat. No. 2,879,126 issued to Edward W. James. Similarly the translator of this invention may be generally of the type described by James. Alternatively the signals may be transmitted by means known in the art to recording means located at the surface.

In the operation of the method of this invention variables are detected and signals resulting therefrom are recorded during vertical movement of the well pipe through a borehole filled with a liquid. Usually the process will be used when it is necessary to pull the drill string from the hole in order to change bits. In such a situation the instrument 16 will be dropped through the drill string to the lower end of the string until it rests on the bit. The drill string is then pulled from the hole while the instrument is being operated. Alternatively, the instrument may be placed in the drill string and operated while going into the hole. After the bit reaches the bottom, a conventional overshot may be run in on a wire line to engage a fishing neck 34 on the instrument and retrieve it from the well. The instrument may then be opened and the record analyzed immediately to determine borehole conditions.

One type of sensor 22 which may be used in the apparatus of this invention is a sound detector, such as a hydrophone of the type manufactured and sold by Massa Division of Cohu Electronics, Inc., of Hingham, Massachusetts. These highly sensitive devices are used, in the method of this invention, to detect variations in the sound pressures resulting from agitation of the liquid in the borehole upon vertical movement of the drill bit therethrough. It will be appreciated that various noises will be created in the liquid in the well bore by the movement of the drill bit therethrough, and that the variations are largely dependent on the physical condition of the well bore. For example, when the bit passes through a section of the bore which encounters a cavity, such as the cavity 36 in FIG. 1, the acoustical effect will be substantially different from that created in portions of the well bore which are comparatively smooth-walled and are of substantially the same diameter as the bit. Indications of these acoustical effects are, according to this invention, recorded by the recording head 26. Since most of the length of the borehole will be substantially the same diameter, the acoustical effect will be substantially uniform, or variations will be small and comparatively gradual, throughout most of the movement through the hole. A comparatively sharp change in the record created will therefor indicate the presence of a cavern intersected by the borehole. This method is particularly useful for locating lost circulation zones, i.e., zones in the formation into which drilling fluid flows readily.

During the movement of the drill string through the hole, it will be necessary to stop at tool joints to break down the drill string. When movement is stopped, the recording continues, but no noise is being generated in the hole, therefore the record will show zero signal periods corresponding to the times during which the pipe is not being moved. These periods on the record provide a convenient means for determining the depth to any particular anomaly in the borehole.

In another form of the invention the sensor 22 comprises a fluid velocity sensitive device which generates a signal proportional to the velocity of liquid flow through the lower end of the drill pipe. Such devices, as for example the propeller type, are well known in the art and need not be described here. It will be appreciated that when the drill pipe is being pulled from the hole fluid flows the interior of the drill pipe at a velocity which is dependent upon several variables, such as the rate of pulling of the drill pipe and the configuration of the borehole. The velocity will also be affected in some cases by formation fluids which flow into the borehole. Such formation fluids flow into the borehole because the rapid rate rate at which the drill string is pulled causes a reduction in the pressure in the borehole below the lower end of the drill string to a level below that pressure required to hold well fluids in the formation. The flow of such formation fluids into the borehole may cause a reverse flow in the well pipe, which reverse flow will be indicated on the record made by the instrument in the hole. Such a change indicates a porous wall of the borehole through which formation fluids could flow. The record also indicates the presence of underground caverns, such as the cavern 36 traversed by the borehole, since such caverns cause a difference in the rate of flow of fluid through the well pipe.

With the use of a flow-indicating device, as in the case of the hydrophone, indications appear on the record of the stopping of the movement of the pipe to separate joints, so that the record indicates the location of any anomaly in the borehole.

The location of points at which well fluids flow into the borehole may also be facilitated by the inclusion in the instrument of a sensor which produces a signal in response to changes in the salinity of the fluid flowing through the well pipe. The measurement of the salinity of liquid in the borehole is particularly advantageous if accomplished during movement of the well pipe into the hole.

It will be appreciated that various other variable characteristics of the liquid in the borehole will indicate changes in the physical characteristics of the borehole at various levels. For example gas cutting of the drilling mud can be detected and recorded, thereby giving an indication of the porosity of the borehole wall. The pressure in the annulus between the drill pipe and the borehole wall, and the pressure within the drill pipe may be measured where it is desirable to perform calculations on the flow rate in and out of the drill pipe through the bit. This invention does not contemplate the provision of any new device for producing a signal in response to variation in a characteristic of a liquid since such devices are well known to those skilled in the art. The invention does, however, contemplate the use of such devices in a manner not heretofore contemplated to provide information concerning physical characteristics of a well borehole, which information has not been readily available heretofore except by means of instruments and procedures which were not usable during drilling operations.

I am not aware of any previous use of any logging method utilizing the concept of the present invention. Jan J. Arps has a number of patents, including U.S. Pat. Nos. 2,890,019, 2,925,251, and 2,917,704 which cover various means for logging earth formations while drilling. However none of these contemplate the determination of physical characteristics of a borehole itself by means of measuring transient effects on a liquid in the borehole. I am also aware of the electric logging tool advertised by Otis Engineering Corporation on page 3919 of the 1962—63 Composite Catalog of Oil Field Equipment. Furthermore I am aware of various other logging tools, such as for example those disclosed in the following U.S. Pat. Nos.:

2,568,241—P. W. Martin
2,755,431—Scherbatskoy
2,898,088 R. L. Alder
2,936,614—J. K. Godbey
2,957,159—J. Fitchette
3,015,801—D. C. Kalbfell It will be apparent, however, from a study of these patents and other patents in this field generally, that none of them suggest the concept of the present invention.

Although a specific embodiment of the invention has been shown and described herein the invention is not limited thereto but only as set forth by the following claims:

I claim:

1. A method for locating a cavity traversed by a well bore containing a liquid, which comprises positioning a sound detector and a recorder therefor in a drill string carrying a drill bit in the well bore, said sound detector being adjacent said drill bit, moving the drill bit and the sound detector vertically through the liquid in the well bore and past the cavity, whereby the movement of the drill bit agitates the liquid to cause sound pressure variations, and operating said sound detector and recorder to record said sound pressure variations during such vertical movement, including any anomaly in said sound pressure variations which is caused by passing the cavity.